US009298789B2

(12) United States Patent
Hao et al.

(10) Patent No.: US 9,298,789 B2
(45) Date of Patent: Mar. 29, 2016

(54) PLACEMENT OF CELLS IN BINS TO PROVIDE NON-OVERLAPPING VISUALIZATION OF DATA POINTS OF A SCATTER PLOT

(75) Inventors: Ming C. Hao, Palo Alto, CA (US); Umeshwar Dayal, Saratoga, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 2009 days.

(21) Appl. No.: 12/321,612

(22) Filed: Jan. 23, 2009

(65) Prior Publication Data

US 2010/0188413 A1   Jul. 29, 2010

(51) Int. Cl.
G09G 5/377 (2006.01)
G06F 17/30 (2006.01)
G06T 11/00 (2006.01)

(52) U.S. Cl.
CPC ........ G06F 17/30572 (2013.01); G06T 11/001 (2013.01)

(58) Field of Classification Search
CPC .................................................... G06T 11/001
USPC ........................................................ 345/589
See application file for complete search history.

(56) References Cited

U.S. PATENT DOCUMENTS

| 3,487,308 | A | 12/1969 | Johnson |
| 5,581,797 | A | 12/1996 | Baker |
| 5,608,904 | A | 3/1997 | Chaudhuri et al. |
| 5,623,590 | A | 4/1997 | Becker et al. |
| 5,623,598 | A | 4/1997 | Voigt et al. |
| 5,634,133 | A | 5/1997 | Kelley |
| 5,659,768 | A | 8/1997 | Forbes et al. |
| 5,694,591 | A | 12/1997 | Du et al. |
| 5,757,356 | A | 5/1998 | Takasaki et al. |
| 5,801,688 | A | 9/1998 | Mead et al. |
| 5,878,206 | A | 3/1999 | Chen et al. |
| 5,903,891 | A | 5/1999 | Chen et al. |
| 5,924,103 | A | 7/1999 | Ahmed et al. |

(Continued)

FOREIGN PATENT DOCUMENTS

EP   0778001   11/1996

OTHER PUBLICATIONS

Deun et al., Multidimensional Scaling, Open and Distance Learning, Jan. 12, 2000 (pp. 1-16).
http://www.pavis.org/essay/multidimensional_scaling.html, 2001 Wojciech Basalaj, (pp. 1-30).

(Continued)

Primary Examiner — Javid A Amini
(74) Attorney, Agent, or Firm — Trop, Pruner & Hu, P.C.

(57) ABSTRACT

To provide non-overlapping visualization of data points of a scatter plot, bins in a visualization screen are defined. The bins are defined along a first dimension by a first attribute of the data points, and along a second dimension by a second attribute of the data points. Cells representing corresponding data points in the bins are placed using a placement algorithm that positions the cells in the bins according to values of the first and second attributes of the corresponding data points. If the placement algorithm detects plural data points that have identical values of the first and second attributes, the placement algorithm groups the data points having the identical values in nearby positions surrounding a position corresponding to the identical values of the first and second attributes to avoid overlay of the data points having the identical values of the first and second attributes.

16 Claims, 5 Drawing Sheets
(3 of 5 Drawing Sheet(s) Filed in Color)

(56) References Cited

U.S. PATENT DOCUMENTS

| | | | |
|---|---|---|---|
| 5,929,863 | A | 7/1999 | Tabei et al. |
| 5,940,839 | A | 8/1999 | Chen et al. |
| 5,953,006 | A | 9/1999 | Baker |
| 5,986,673 | A | 11/1999 | Martz |
| 5,999,192 | A | 12/1999 | Selfridge |
| 5,999,193 | A | 12/1999 | Conley, Jr. et al. |
| 6,052,890 | A | 4/2000 | Malagrino, Jr. et al. |
| 6,144,379 | A | 11/2000 | Bertram et al. |
| 6,188,403 | B1 | 2/2001 | Sacerdoti |
| 6,211,880 | B1 | 4/2001 | Impink, Jr. |
| 6,211,887 | B1 | 4/2001 | Meier et al. |
| 6,269,325 | B1 | 7/2001 | Lee et al. |
| 6,373,483 | B1* | 4/2002 | Becker et al. ............... 345/419 |
| 6,384,847 | B1 | 5/2002 | Rabenhorst |
| 6,400,366 | B1 | 6/2002 | Davies et al. |
| 6,429,868 | B1 | 8/2002 | Dehner, Jr. et al. |
| 6,466,946 | B1 | 10/2002 | Mishra et al. |
| 6,466,948 | B1 | 10/2002 | Levitsky et al. |
| 6,502,091 | B1 | 12/2002 | Chundi et al. |
| 6,584,433 | B1 | 6/2003 | Zhang et al. |
| 6,590,577 | B1 | 7/2003 | Yonts |
| 6,603,477 | B1 | 8/2003 | Tittle |
| 6,658,358 | B2 | 12/2003 | Hao et al. |
| 6,684,206 | B2 | 1/2004 | Chen et al. |
| 6,727,926 | B1 | 4/2004 | Utsuki et al. |
| 6,934,578 | B2 | 8/2005 | Ramseth |
| 7,020,869 | B2 | 3/2006 | Abrari et al. |
| 7,038,680 | B2* | 5/2006 | Pitkow ............... 345/440 |
| 7,202,868 | B2 | 4/2007 | Hao |
| 7,221,474 | B2 | 5/2007 | Hao et al. |
| 7,313,533 | B2 | 12/2007 | Chang et al. |
| 7,567,250 | B2 | 7/2009 | Hao et al. |
| 7,714,876 | B1 | 5/2010 | Hao |
| 7,716,227 | B1 | 5/2010 | Hao |
| 7,800,613 | B2* | 9/2010 | Hanrahan et al. ............... 345/440 |
| 7,844,926 | B1 | 11/2010 | Russell |
| 7,921,363 | B1 | 4/2011 | Hao |
| 7,924,283 | B1 | 4/2011 | Hao |
| 7,940,271 | B2* | 5/2011 | Wright et al. ............... 345/440 |
| 2002/0118193 | A1 | 8/2002 | Halstead, Jr. |
| 2003/0065546 | A1 | 4/2003 | Goruer et al. |
| 2003/0071815 | A1 | 4/2003 | Hao et al. |
| 2003/0128212 | A1* | 7/2003 | Pitkow ............... 345/440 |
| 2003/0221005 | A1 | 11/2003 | Betge-Brezetz et al. |
| 2004/0051721 | A1 | 3/2004 | Ramseth |
| 2004/0054294 | A1 | 3/2004 | Ramseth |
| 2004/0054295 | A1 | 3/2004 | Ramseth |
| 2004/0095349 | A1 | 5/2004 | Bito |
| 2004/0183799 | A1 | 9/2004 | Hao |
| 2004/0201588 | A1 | 10/2004 | Meanor et al. |
| 2004/0210540 | A1 | 10/2004 | Israel et al. |
| 2005/0066026 | A1 | 3/2005 | Chen et al. |
| 2005/0119932 | A1 | 6/2005 | Hao |
| 2005/0219262 | A1 | 10/2005 | Hao et al. |
| 2006/0028471 | A1 | 2/2006 | Kincaid |
| 2006/0095858 | A1 | 5/2006 | Hao et al. |
| 2006/0221077 | A1* | 10/2006 | Wright et al. ............... 345/428 |
| 2007/0040094 | A1 | 2/2007 | Smith |
| 2007/0225986 | A1 | 9/2007 | Bowe, Jr. et al. |
| 2008/0007555 | A1 | 1/2008 | Vrba |
| 2008/0033790 | A1 | 2/2008 | Nickerson |
| 2009/0033664 | A1 | 2/2009 | Hao et al. |
| 2010/0103176 | A1 | 4/2010 | Hao |
| 2010/0182320 | A1* | 7/2010 | Cartan ............... 345/440 |
| 2010/0188413 | A1* | 7/2010 | Hao et al. ............... 345/589 |
| 2010/0231594 | A1 | 9/2010 | Hao |

OTHER PUBLICATIONS

D. Keim et al Pixel Bar Charts: A New Technique for Visualization Large Multi-Attribute Data Sets with Aggregation:, HP Technical Report, Apr. 2001, pp. 1-10.

M. Ankerst et al "Towards an effective cooperation of the computer and the computer user for classification, Proc. 6th Int. Conf. on Knowledge Discovery and Data Mining ," (KDD'2000), Aug. 20-23, 2000, Boston, MA, 2000, pp. 1-10.

M.C. Hao et al "Visual Mining of E-customer Behavior Using Pixel Bar Charts,", HP Technical Report, Jun. 20, 2001, pp. 1-7.

B. Shneiderman, "Tree Visualization with Treemaps: a 2-D Space-Filling Approach", pp. 1-10, Jun. 1991.

Daniel Keim et al "Designing Pixel-Orientated Visualization Techniques: Theory and Applications" IEEE Transactions on Visualization and Computer Graphics, vol. 6, No. 1, Jan.-Mar. 2000, pp. 59-78.

Jessica Lin, Eamonn Keogh, Stefano Lonardi, Jeffrey P. Lankford, Donna M. Nystrom; Visually Mining and Monitoring Massive Time Series; 2004; International Conference on Knowledge Discovery and Data Mining archive, Proceedings of the tenth ACM SIGKDD international conference on Knowledge discovery and data mining table of contents; pp. 460-469.

Eamonn Keogh, Harry Hochheiser, and Ben Shneiderman; An Augmented Visual Query Mechanism for Finding Patterns in Time Series Data; 2002; Lecture Notes in Computer Science, Proceedings of the 5th International Conference on Flexible Query Answering Systems; Springer-Verlag; vol. 252212002; pp. 240-250.

Chris Stolte et al., "Polaris: A System for Query, Analysis and Visualiztion of Multidimensional Relational Databases," IEEE Transactions on Visualization and ComputerGraphics, vol. 8, No. 1, pp. 1-14 (Jan.-Mar. 2002).

Daniel A. Keim et al., "VisDB: Database Exploration Using Multidimensional Visualization," IEEE Graphics and Applications, vol. 14, No. 5, pp. 40-49 (1994).

Matthew O. Ward, "XmdvTool: Integrating Multiple Methods for Visualizing Multivariate Data," Proc. Visualization, pp. 326-331 (Oct. 1994).

H. Hochheiser et al., "Dynamic Query Tools for Time Series Data Sets: Timebox Widgets for Interactive Exploration," Information Visualization, vol. 3, pp. 1-18 (2004.

P. Buono et al., "Technical Research Report, Interactive Pattern Search in Time Series," Institute for Systems Research, TR 2005-57, pp. 1-11 (2004.

J. Yang et al., "Visual Hierarchical Dimension Reduction for Exploration of High Dimensional Datasets," Joint Eurographics/IEEE TCVG Symposium on Visualization, pp. 19-28 (May 2003).

J. Fekete et al., "Interactive Information Visualization of a Million Items," Information Visualization, 2002, INFOVIS 2002, IEEE Symposium, Published Oct. 2002, pp. 1-8.

M. Trutschl et al., "Intelligently Resolving Point Occlusion," Information Visualization, 2003, INFOVIS 2003, IEEE Symposium, Published Oct. 2003, Abstract only.

T. Buring et al., "User Interaction with Scatterplots on Small Screens—A Comparative Evaluation of Geometric-Semantic Zoom and Fisheye Distortion,"Visualization and Computer Graphics, IEEE Transactions, Published Sep.-Oct. 2006, pp. 1-8.

U.S. Appl. No. 12/381,716, Non-Final Rejection dated Mar. 30, 2012, pp. 1-12 and attachments.

Christopher Ahlberg et al., Dynamic Queries for Information Exploration: An Implementation and Evaluation, May 3-7, 1992, ACM, 619-626.

Notice of Allowance cited in Application No. 13/714,871 mailed Nov. 18, 2015; 13 pages.

* cited by examiner

FIG. 1

\# OF PARTICIPANTS 1 OR 2 (YELLOW)
\# OF PARTICIPANTS 3-10 (DIFFERENT SHADES OF GREENS)
\# OF PARTICIPANTS 10-100 (DIFFERENT SHADES OF BLUE)

PLACEMENT OF CELLS IN BINS TO PROVIDE NON-OVERLAPPING VISUALIZATION OF DATA POINTS OF A SCATTER PLOT

BACKGROUND

Figure 1:
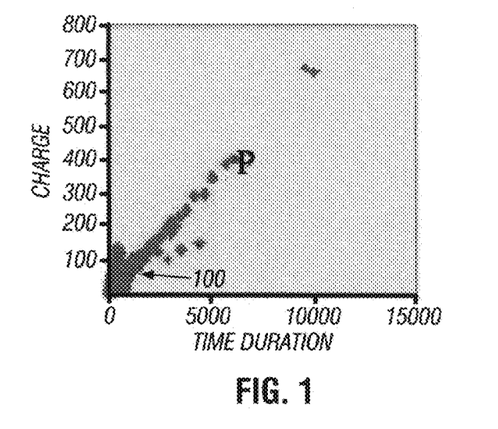
FIG. 1 illustrates a conventional scatter plot that depicts the relationship between two attributes.

Traditional scatter plots have been widely used to display correlation between two variables (or attributes). A scatter plot is a chart that uses Cartesian coordinates (e.g., x-axis or y-axis coordinates) to display values for the two variables. The data displayed in the scatter plot is a collection of points, each having one coordinate on the horizontal axis and one on the vertical axis. An example of a traditional scatter plot is depicted in FIG. 1, where the horizontal axis variable represented in the example of FIG. 1 is time duration (e.g., time length of a telephone call), and the vertical axis corresponds to charge (e.g., dollar amount charged for the telephone call). In the example of FIG. 1, each point in the scatter plot represents a data record of a telephone call.

Various points representing respective telephone calls are plotted in the scatter plot of FIG. 1, where each point corresponds to a particular pair of time duration value and charge value. Generally, a relatively dense region 100 of the scatter plot contains points that represent data records having time duration values under 1,000 (seconds) and charge values under $100. Note that, typically, the vast majority of telephone calls are under 1,000 seconds with charges under $100. Consequently, in the scatter plot of FIG. 1, the points in the region 100 that share the same or almost the same time duration and charge values lay one on top of each other, which results in occlusion of such points. Occlusion prevents a user from seeing the true number of points in dense regions of the scatter plot. Effectively, a traditional scatter plot can show just a relatively small number of distinct data points, even though there may be a much larger number of data points that the viewer cannot see as a result of occlusion (due to overlay of data points). Such occlusion of data points can hide the true extent of the relationship between different variables in a traditional scatter plot.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments of the invention are described, by way of example, with respect to the following figures.

DETAILED DESCRIPTION

In accordance with some embodiments, a visualization technique or mechanism is provided to allow for representation of data points of a scatter plot without overlay of data points (to provide non-overlapping visualization of data points). The visualization technique or mechanism provides a visualization screen that has bins, where the bins are defined along a first dimension (or axis) by a first attribute of the data points, and along a second dimension (or axis) by a second attribute of the data points. A "bin" in the visualization screen refers to a visible partition in the visualization screen that has a first size along the first dimension and a second size along the second dimension, where the first and second sizes are dynamically determined based on the data points to be visualized in the visualization screen. The first and second sizes of the bins are dynamically determined according to the value ranges of the first and second attributes, which are computed from the incoming data points and their density distribution.

A "scatter plot" refers to either a traditional scatter plot or a scatter plot represented with a visualization screen according to some embodiments. A traditional scatter plot uses Cartesian coordinates (e.g., a horizontal or x-axis and a vertical or a y-axis), with data points plotted against the values of the variables in the Cartesian coordinate system to provide the scatter plot. On the other hand, a scatter plot that is represented by a visualization screen according to some embodiments refers to a representation of data points in bins that have cells that represent respective data points, where overlay of data points having the same coordinates as represented by the cells is avoided to avoid occlusion. A "data point" refers to a multi-attribute data item that can have multiple attributes assigned respective values.

In some embodiments, the bins in the visualization screen are generally rectangular shaped, such that each bin has a width and a height. In one embodiment, the widths of the bins in the visualization screen are the same, while the heights of the bins can vary. In a different embodiment, the height of the bins can be the same, while the widths of the bins can vary. By maintaining either the width or height constant across all bins, a viewer is able to more easily detect any distributions, correlations, anomalies, problems, trends, and so forth, in the data points presented by the visualization screen.

Cells representing corresponding data points are placed in the bins using a placement algorithm that positions the cells in the bins according to the values of the first and second attributes of the corresponding data points. In other words, a data point is placed in a position of a bin in the visualization screen according to the coordinates (x and y attribute values) of the data point. Each bin has an array of positions that correspond to respective pairs of x and y values (within the range of x values and range of y values for that bin). For a particular data point that has a first attribute (referred to as "x") and a second attribute (referred to as "y"), the data point is mapped to a corresponding position (x, y) in the bin. A cell can be set to any particular size. For example, a cell can be as small as a single pixel of the display device, or alternatively, a cell can include a collection of multiple pixels. The size of the cells is set according to the volume of data points to be represented in the visualization screen so that all data points can be visualized.

It is noted that cells representing data points with identical x and y values will map to the same position in a corresponding bin. In accordance with some embodiments, the placement algorithm positions the cells in each bin without overlapping any of the cells. Cells representing data points with identical x and y values are not placed in the same position, but rather, are placed in distinct positions, but in close proximity to each other. In some embodiments, the placement algorithm considers the size of each bin (width x height) and the empty spaces between already occupied positions of the bin to determine the best locations for cells that would otherwise overlay existing cells.

In addition, a third attribute (coloring attribute) of the data points is used for assigning colors or other types of visual indicators to respective cells. The third attribute (coloring attribute) can be the same as the first attribute or second attribute, or alternatively, can be different from the first and second attributes.

Figure 2:
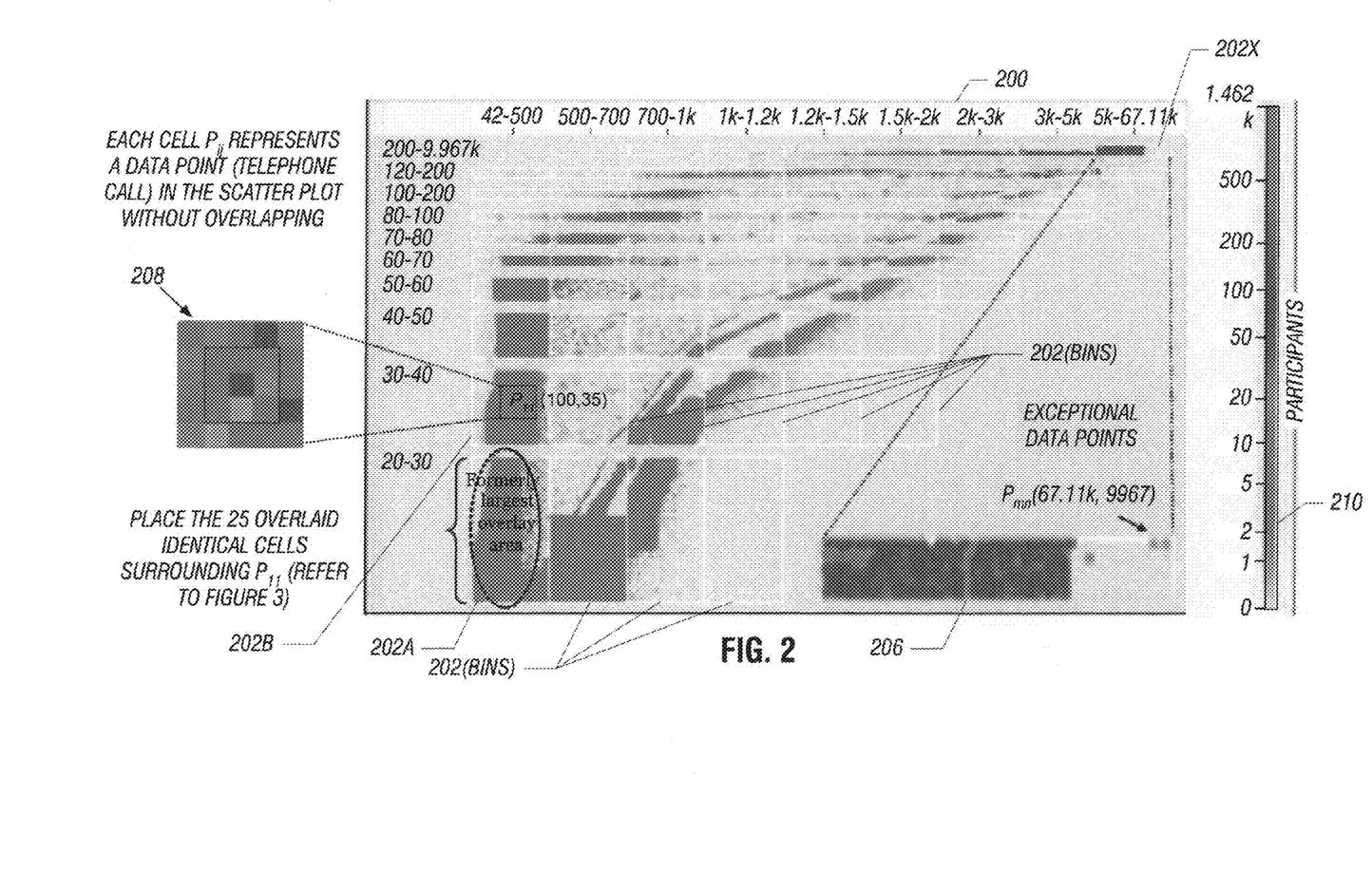
FIG. 2 illustrates a visualization screen that has bins containing cells representing respective data points of a scatter plot, in accordance with an embodiment.

FIG. 2 illustrates a visualization screen 200 that depicts a binned scatter plot that contains multiple bins 202 (delineated by white lines in the example of FIG. 2). The horizontal dimension or axis of the visualization screen 200 corresponds to time duration values (of telephone calls, for example), whereas the vertical dimension or axis of the visualization screen 200 corresponds to charges for the telephone calls, for example. In the example of FIG. 1, the bins 202 have the same width, but different heights. As noted above, in a different embodiment, bins can have the same height, but different widths.

Each cell (representing a data point) is assigned a color based on a coloring attribute. A color scale 210 on the right side of the visualization screen 200 maps different colors to the different values of the coloring attribute. In the example of FIG. 2, the coloring attribute is the number participants in the telephone call.

The bin 202A in the lower, left corner of the visualization screen 200 corresponds to time duration values (x values) in the range of 42-500 seconds, and charge values in the range of $20-30. In other words, any data point that has an x value and a y value within the respective x and y ranges of the bin 202A will be placed in this bin. The other bins in the visualization screen 200 correspond to other ranges of attributes x and y.

The bin 202X in the upper, right corner of the visualization screen 200 is associated with time duration values that are relatively large, and charge values that are relatively large. In one example, a telephone call having time duration 55 and charge 25 will be placed as a cell in the bin 202A. On the other hand, a telephone call having a time duration of 10,000 seconds and a charge of $5,000 will be represented as a cell in the bin 202X.

The data points represented by the bin 202X are considered exceptional data points, and a magnified view 206 of the cells in the bin 202X is provided in the visualization screen 200. A cell having x value 67.11 k and y value 9967 is also identified in the view 206.

The bin 202A corresponds to the largest "overlay" area of a traditional scatter plot, since the bin 202A contains the most data points that share identical x and y values. However, unlike region 100 in the traditional scatter plot of FIG. 1, the cells in the bin 202A are not overlaid over each other.

The visualization screen 200 depicts a first example application of a technique or mechanism according to some embodiments. For example, an operator may wish to find the distribution of expensive telephone calls of long durations. The bins shown in FIG. 2 allow the operator to determine that the volume of telephone calls (bin size) decreases with time duration of calls and increased charges.

The operator can also determine what charges (or range of charges) are most common, and what time durations (or range of time durations) are most common. The binned scatter plot 200 of FIG. 2 also allows the operator to correlate different attributes of the data points—in FIG. 2, the correlated attributes are time durations, charges, and number of participants. In this way, the operator can correlate telephone charges with the time duration of the telephone calls and number of participants in the telephone calls.

Also, by analyzing cells of a certain color, the operator can determine that high number of participants (e.g. over 500 corresponding to the red color) only appears in the long telephone calls in bin 202X (magnified view in 206).

Figure 3:
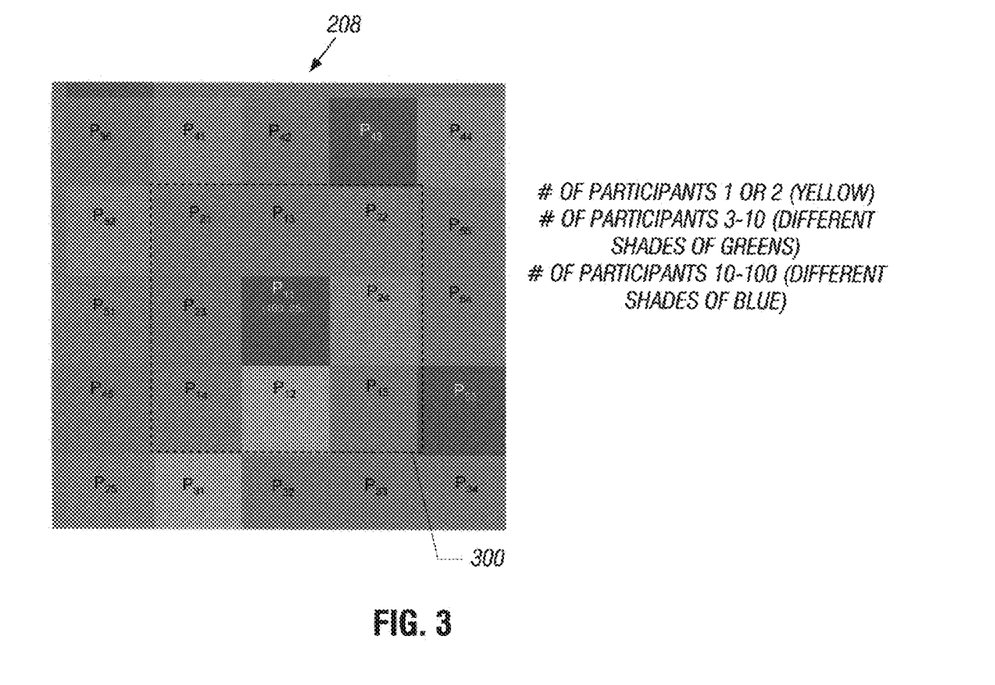
FIG. 3 illustrates a group of cells corresponding to data points that share identical attribute values, positioned according to an embodiment.

In FIG. 2, a group 208 of 25 cells in bin 202B is magnified. This group of 25 cells share identical x and y values. Assuming $P_{11}$ is the first cell placed bin 202B, then subsequent data points sharing identical x and y values that are received will be placed around the cell $P_{11}$. FIG. 3 shows an enlarged version of the group 208 of 25 cells shown in FIG. 2. Cell $P_{11}$ is the first cell placed in a position of the bin 202B corresponding to (x, y) values of (100, 35). Subsequently received cells sharing the same (x, y) values of (100, 35) include data points $P_{12}$, $P_{15}$, $P_{24}$, $P_{22}$, $P_{13}$, $P_{21}$, $P_{23}$, and $P_{14}$, which are placed around cell $P_{11}$. This inner group of nine cells is identified by a dashed box 300. The cells in the dashed box 300 share identical x and y values.

The remaining cells around the dashed box 300 also share the same x and y values, but are placed outside the box 300 because such data points were received after the data points represented in the box 300. The placement algorithm thus places cells that share identical x and y values on a first come, first placed basis in nearby positions (such as within ones, tens, or hundreds of cells) surrounding a position corresponding to the particular pair of x and y values.

Figure 4:
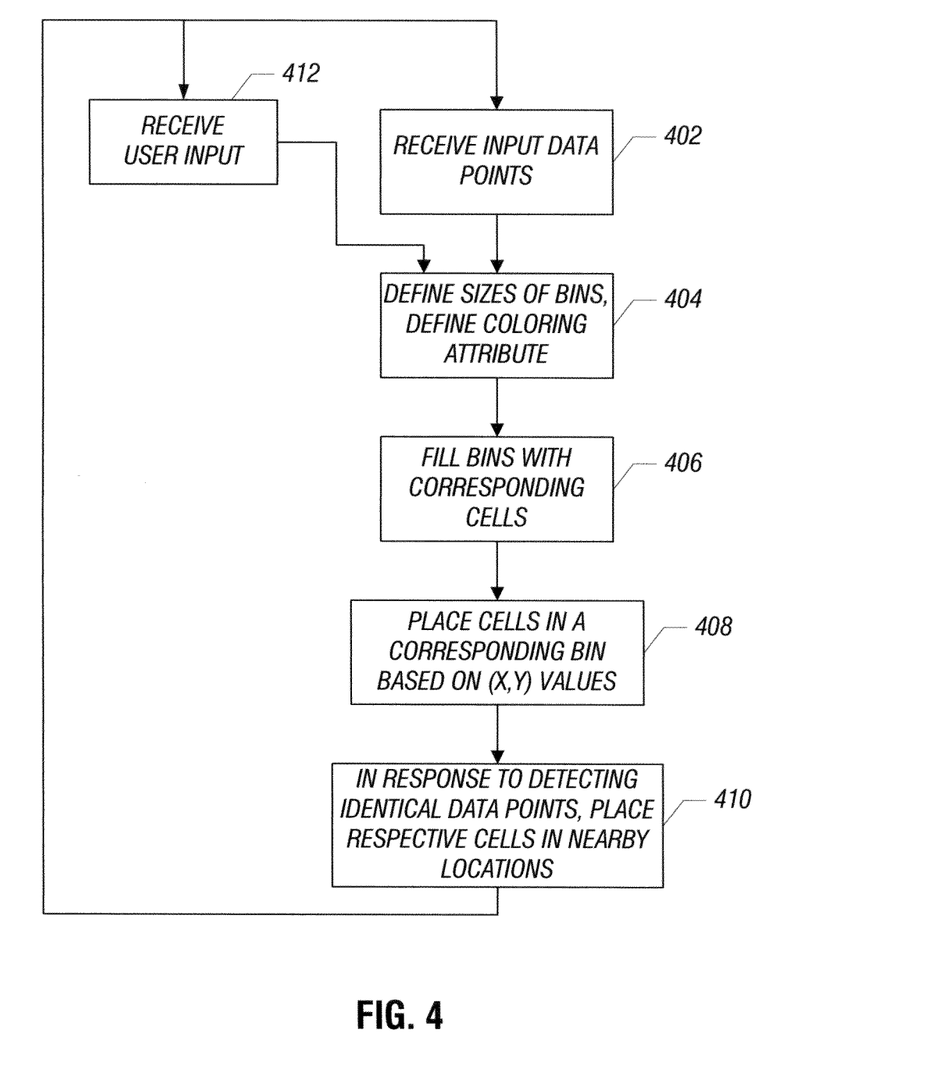
FIG. 4 is a flow diagram of a process of visualizing data points of a scatter plot, according to an embodiment.

FIG. 4 shows a flow diagram of a visualization process according to an embodiment. The visualization process receives (at 402) input data points. Note that the input data points can be received on a continual basis (e.g., in real-time) or alternatively, the input data points can be retrieved from a database or log file that was previously saved. The visualization process receives input data points in "real-time" if the visualization process updates the visualization of the data points as new data points are received.

Based on the input data points, sizes of bins are defined (at 404). The sizes of bins are based on the ranges of x and y values of the input data points. Also, the sizes of some bins can be set to be different from the sizes of other bins, depending upon the number of cells within the respective bins. In other words, a bin containing a larger number of cells will be larger than a bin containing a smaller number of cells. The different sizes of the bins allow a user to more easily detect distributions of data-points in the different bins.

Also, the coloring attribute is defined (at 404). The coloring attribute specifies the color to be assigned to a cell based on the value of the coloring attribute.

The bins are filled (at 406) with corresponding cells. The cells are placed (at 408) in a corresponding bin based on the (x,y) values (the coordinates) of the respective data points. In other words, a cell is mapped to a particular position of a corresponding bin based on the x and y values of the corresponding data point.

However, in response to detecting identical data points (that share identical x and y values), the visualization process does not map such identical data points to the same position in the bin (which would result in overlay), but rather, the visualization process will place (at 410) the cells representing such identical data points in nearby locations, such as according to the grouping depicted in FIG. 3. Note that the first data point having a particular pair of x and y values will be mapped exactly to the corresponding position in the bin—however, subsequently received data points sharing the same x and y values will be placed around this first data point (as depicted in FIG. 3).

Placement of the cells representing the identical data points in nearby locations considers the amount of space available between occupied positions in a bin. The placement algorithm will place the identical data points in a larger available space close to the first data point, if sufficient space exists. If sufficient space does not exist, then the placement algorithm will place the identical data points as close as possible elsewhere.

The visualization process then returns to process more input data points, or alternatively, to update the visualization screen 200 based on receiving (at 412) user input. Note that the binned scatter plot 200 can be interactive, such that a user can move a pointer over a cell to display the attribute values of the cell and other detailed information. A user can also rubber-band or perform other selection with respect to a group of cells to zoom in for further analysis.

As additional data points are received, the visualization process can also increase the size of certain bins. Thus, the visualization process grows bins to larger sizes as additional data points are received.

Figure 5:
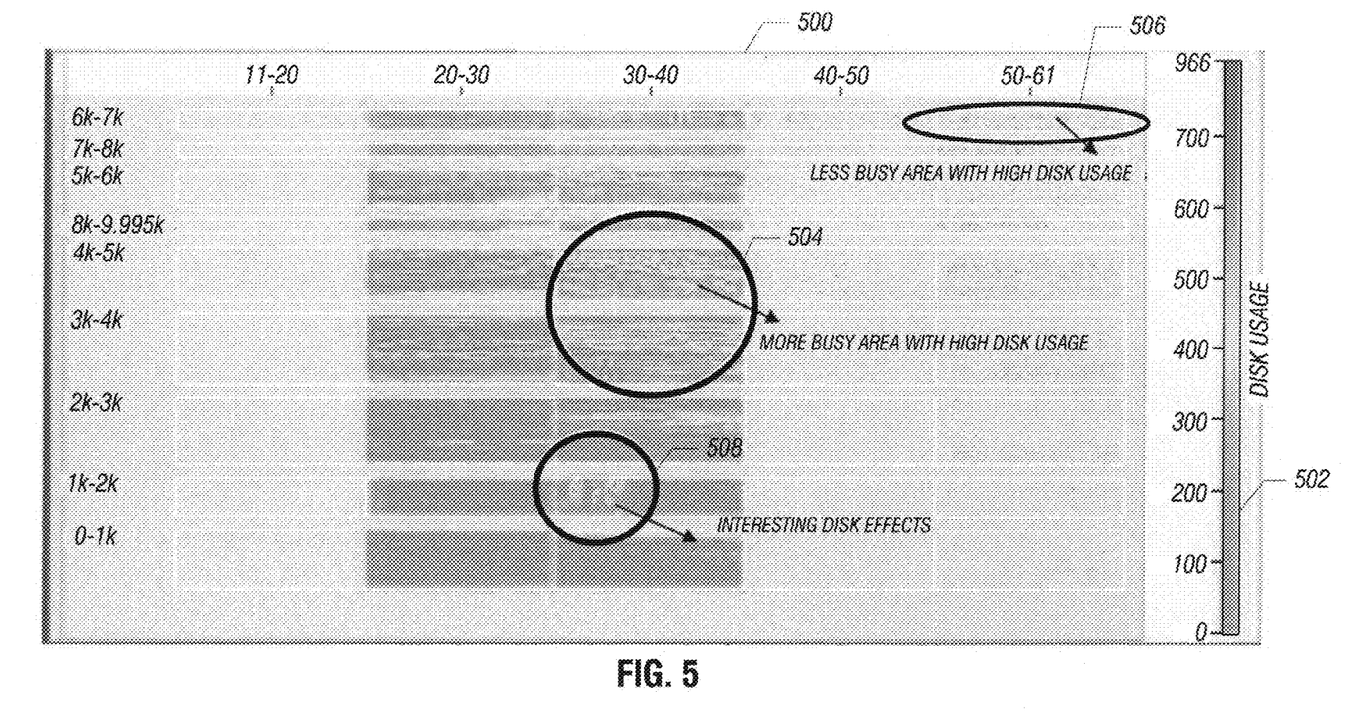
FIG. 5 illustrates another visualization screen that has bins containing cells representing respective data points of a scatter plot, in accordance with another embodiment.

FIG. 5 shows a visualization screen 500 according to another example. As with the visualization screen 200 depicted in FIG. 2, multiple bins are defined to visualize cells representing respective data points. The horizontal dimension of the visualization screen 500 in FIG. 5 represents a first attribute that is a number of jobs (such as jobs submitted to a server). The vertical dimension of the visualization screen 500 corresponds to memory usage. The coloring attribute, as represented by the color scale 502, is disk usage. With the visualization screen 500, an operator can correlate number of jobs with memory usage and disk usage.

An oval 504 includes bins that contain cells corresponding to data points with high disk usage. The bins in oval 504 contain a relatively large number of data points (indicating that the bins are in a busy area). On the other hand, an oval 506 in the visualization screen 500 includes a bin that has cells corresponding to data points with high disk usage, but there are a much smaller number data points in the oval 506 (which indicates a less busy area). Another oval 508 contains cells that exhibit other interesting disk effects. In the oval 508, most jobs have low disk usage (green), except for two exceptional clusters (orange) of high disk usage.

Figure 6:
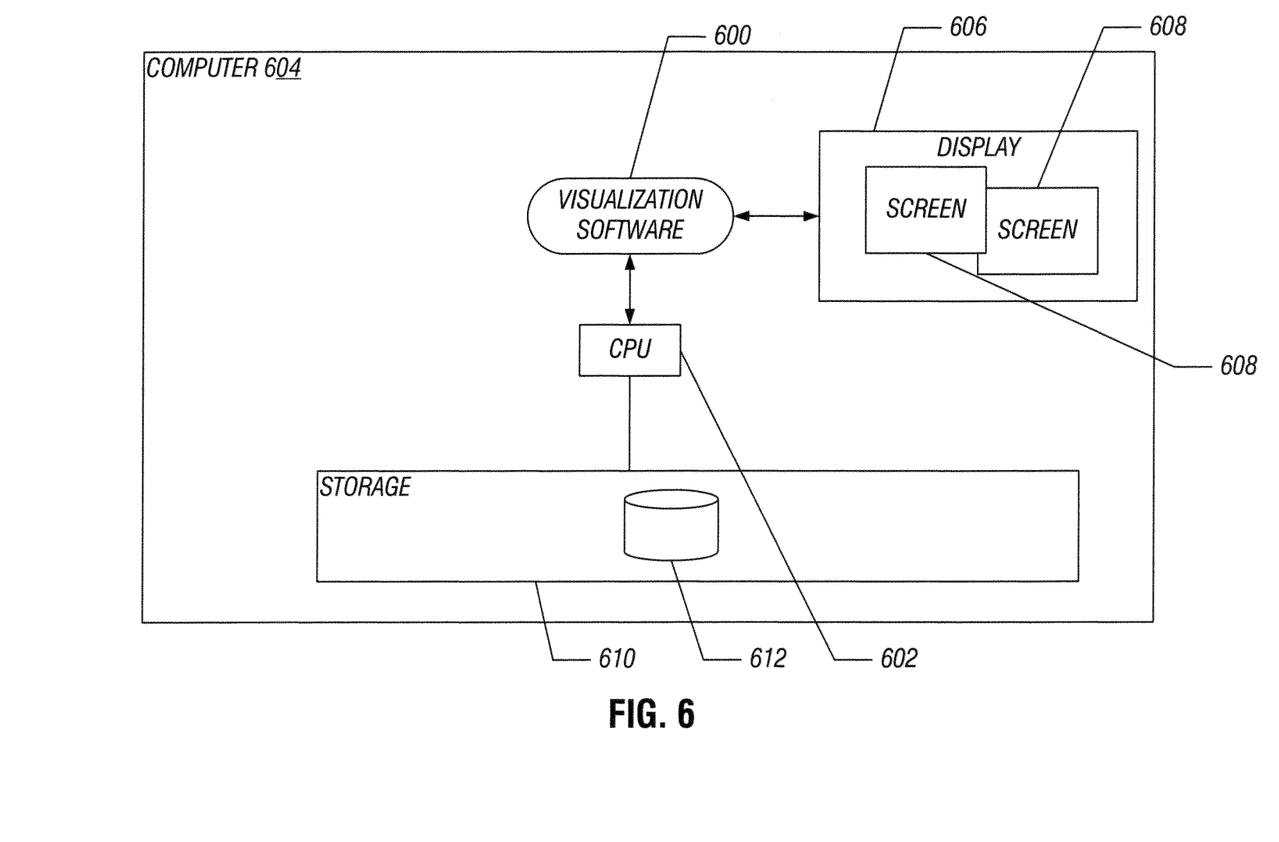
FIG. 6 is a block diagram of an exemplary computer including visualization software to provide visualization screens according to some embodiments.

FIG. 6 shows an example computer 604 in which visualization software 600 is executable, in accordance with some embodiments. The visualization software 600 is able to perform the various tasks described above. The visualization software 600 is executed on one or more central processing units (CPUs) 602, which is connected to a storage 610. The storage 610 stores a database 612 that can contain input data points to be processed by the visualization software 600. Alternatively, the input data points can be received in real-time over a network interface.

The computer 604 also includes a display device 606 in which visualization screen 608 (such as the visualization screens depicted in FIGS. 2, 3, and 5) can be presented.

Instructions of software described above (including the visualization software 600 of FIG. 6) are loaded for execution on a processor (such as one or more CPUs 602 in FIG. 6). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMS) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method executed by a computer of non-overlapping visualization of data points of a scatter plot, comprising:
    defining bins in a visualization screen, wherein the bins are defined along a first dimension by a first attribute of the data points, and along a second dimension by a second attribute of the data points; and
    placing cells representing corresponding data points in the bins using a placement algorithm that positions the cells in the bins according to values of the first and second attributes of the corresponding data points, wherein if the placement algorithm detects plural data points that have identical values of the first and second attributes, the placement algorithm groups the data points having the identical values in nearby positions surrounding a position corresponding to the identical values of the first and second attributes to avoid overlay of the data points having the identical values of the first and second attributes.

2. The method of claim 1, further comprising:
    assigning colors to the cells in the bins according to a coloring attribute of the data points.

3. The method of claim 1, further comprising:
    determining sizes of the bins based on a range of values of the first attribute and a range of values of the second attribute in the data points.

4. The method of claim 3, further comprising:
    setting sizes of at least some of the bins to be different from sizes of other bins depending upon numbers of cells contained in the bins.

5. The method of claim 4, wherein the bins have equal width and different heights.

6. The method of claim 4, wherein the bins have equal height and different widths.

7. The method of claim 1, further comprising:
    increasing a size of at least one of the bins as additional data points are received.

8. The method of claim 1, wherein values of the first and second attributes of corresponding data points define coordinates in respective bins.

9. The method of claim 1, wherein the placement algorithm considers spacing between occupied cells in the bins to place additional cells corresponding to additional data points.

10. A method executed by a computer of non-overlapping visualization of data points of a scatter plot, comprising:
    receiving the data points;
    defining bins of varying sizes in a visualization screen according to first and second attributes of the data points;
    placing cells in respective bins, the cells representing corresponding data points, wherein a position of a particular cell in a corresponding bin is defined by a coordinate based on values of the first attribute and second attribute of the data point corresponding to the particular cell;
    after positioning a first cell representing a first data point in a corresponding bin, receiving a second data point having identical values of the first and second attributes as the first data point; and
    positioning a second cell representing the second data point adjacent the first cell to avoid overlay of the first and second cells.

11. The method of claim 10, further comprising:
    assigning colors to the cells according to a third attribute of the data points.

12. The method of claim 10, wherein receiving the data points comprises receiving the data points in real time or receiving the data points from a log file.

13. An article comprising at least one non-transitory computer-readable storage medium containing instructions that when executed by a computer cause the computer to:
    receive data points;
    define bins of varying sizes in a visualization screen according to first and second attributes of the data points; and
    place cells in respective bins, the cells representing corresponding data points, wherein a position of a particular cell in a corresponding bin is defined by a coordinate based on values of the first attribute and second attribute of the data point corresponding to the particular cell, wherein placing the cells comprises using a placement technique that detects plural data points that have identical values of the first and second attributes, the placement technique grouping the data points having the identical values in nearby positions surrounding a position corresponding to the identical values of the first and second attributes to avoid overlay of the data points having the identical values of the first and second attributes.

14. The article of claim 13, wherein the instructions when executed cause the computer to further:
    assign colors to the cells according to a third attribute of the data points.

15. The method of claim 1, wherein the plural data points each share a value of the first attribute and each share a value of the second attribute, where the shared value of the first attribute and the shared value of the second attribute map to a given position in a corresponding bin, and wherein the placement algorithm places a cell representing a first of the plural data points at the given position, and places cells representing others of the plural data points in the nearby positions surrounding the given position.

16. The article of claim 13, wherein the plural data points each share a value of the first attribute and each share a value of the second attribute, where the shared value of the first attribute and the shared value of the second attribute map to a given position in a corresponding bin, and wherein the placement technique places a cell representing a first of the plural data points at the given position and places cells representing others of the plural data points in the nearby positions surrounding the given position.

* * * * *